Nov. 1, 1938.    E. A. ROCKWELL    2,135,114
VACUUM BRAKE BOOSTER
Filed July 3, 1934    4 Sheets-Sheet 3
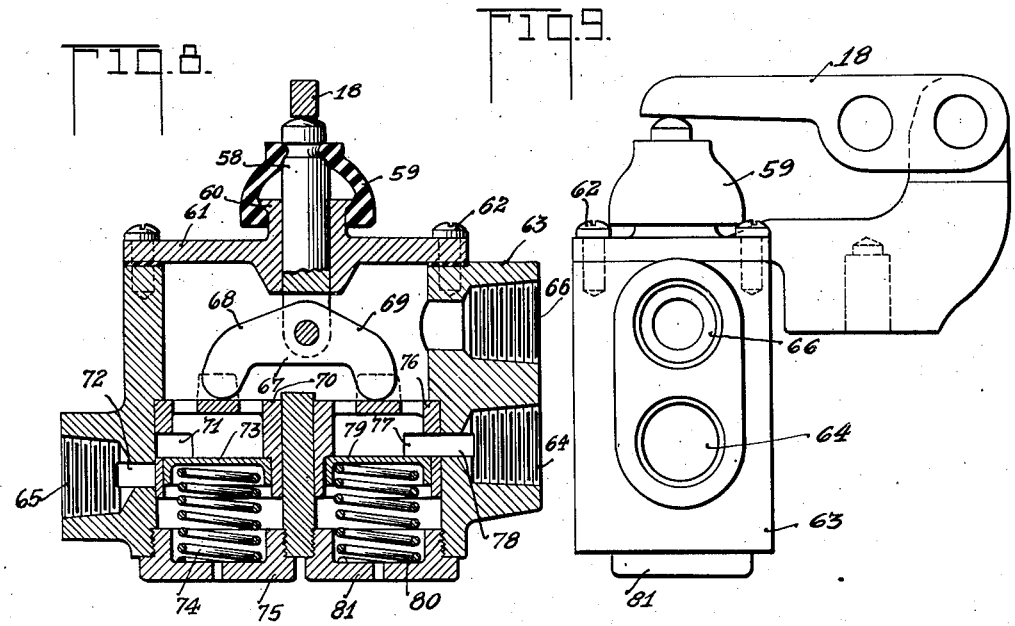
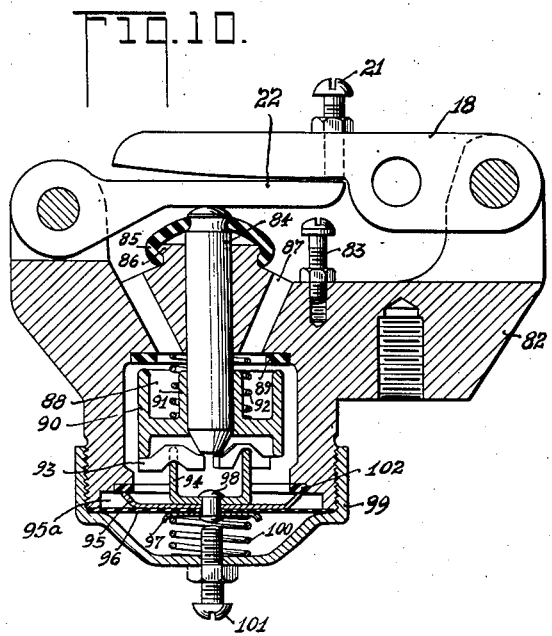
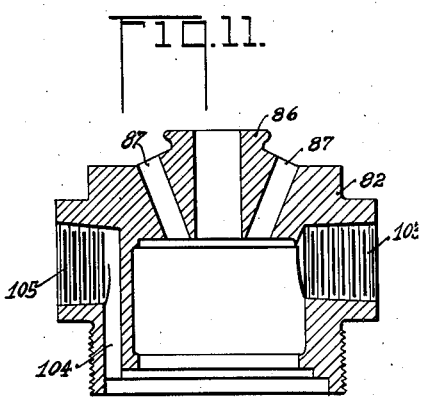
INVENTOR
EDWARD A. ROCKWELL
BY
Arthur Wright
ATTORNEY Nov. 1, 1938.  E. A. ROCKWELL  2,135,114
VACUUM BRAKE BOOSTER
Filed July 3, 1934  4 Sheets-Sheet 4

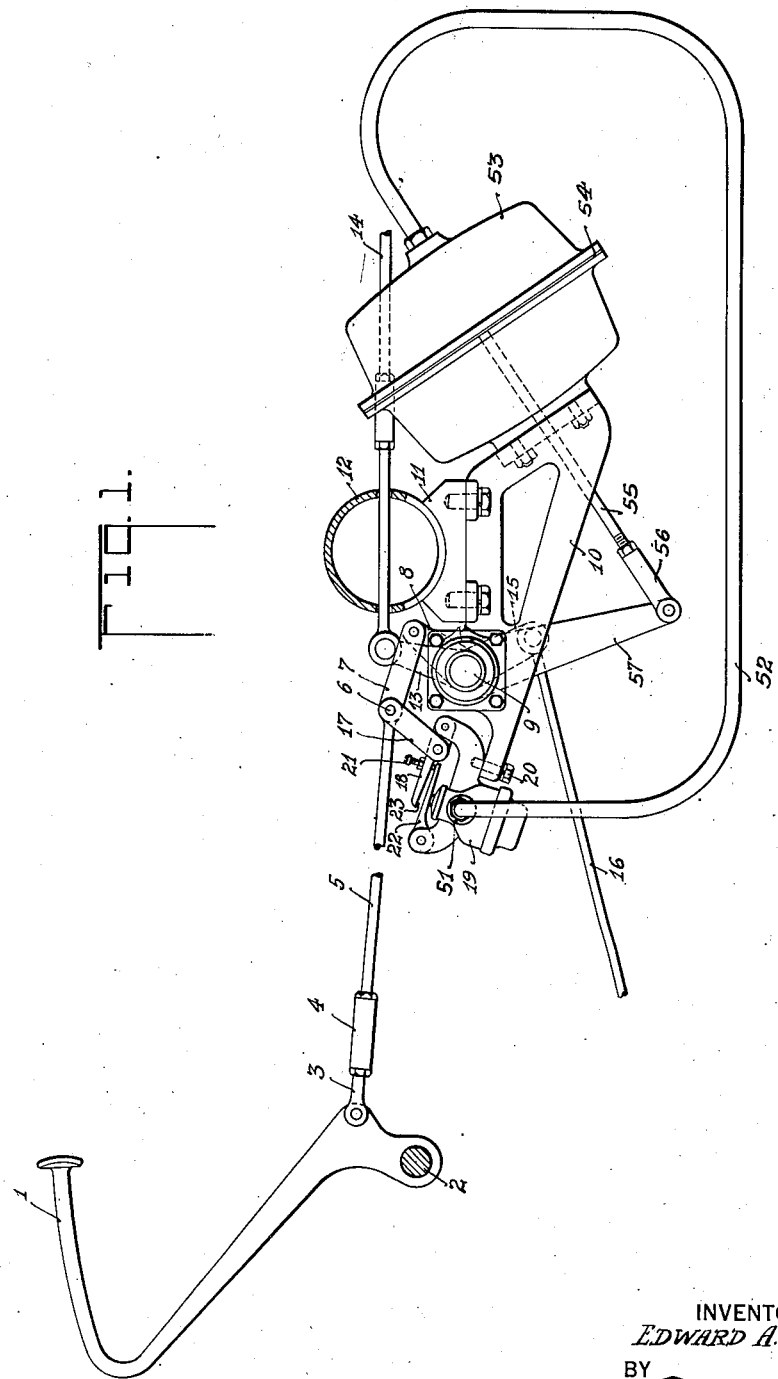

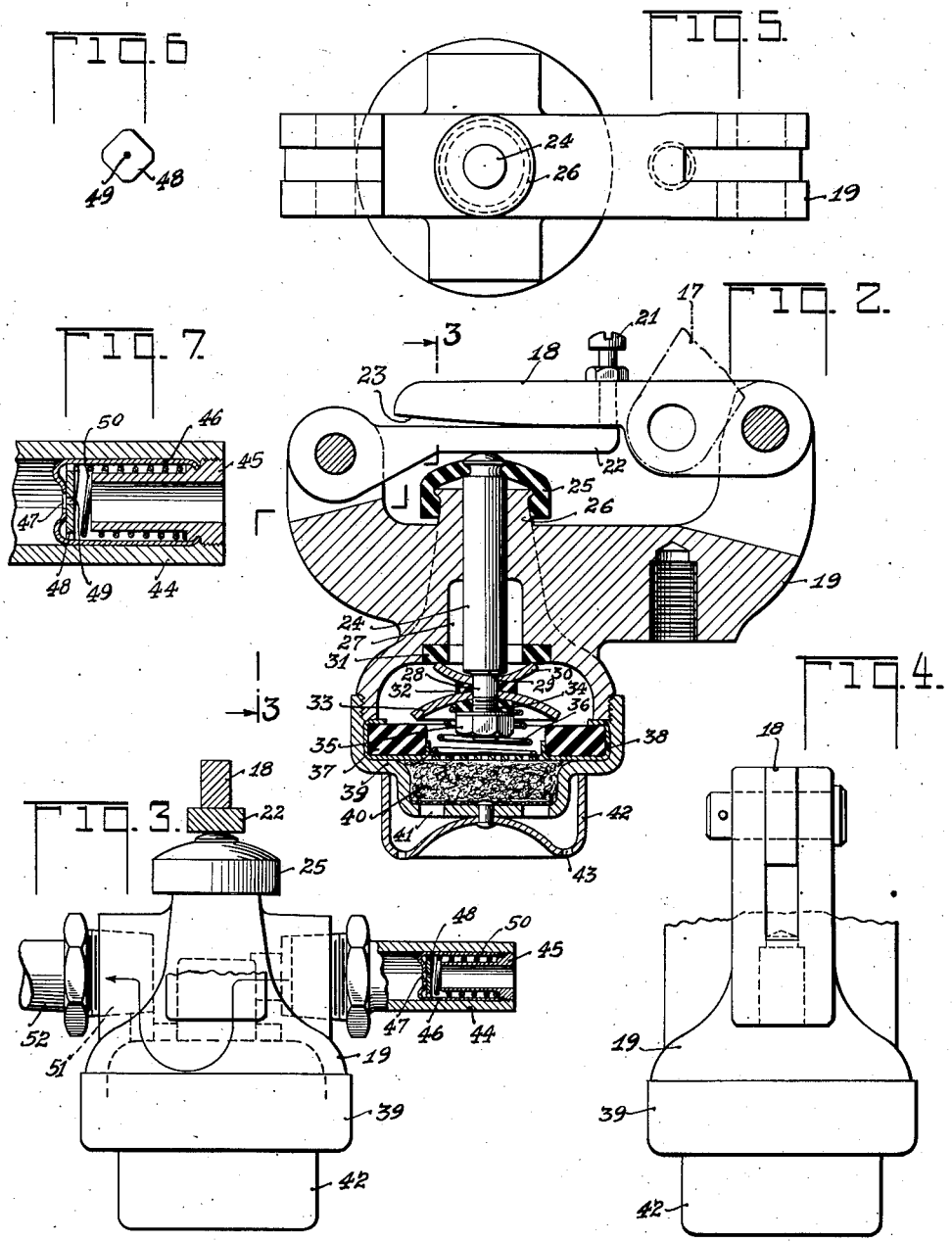

INVENTOR
EDWARD A. ROCKWELL
BY
Arthur Wright
ATTORNEY

Patented Nov. 1, 1938

2,135,114

UNITED STATES PATENT OFFICE 2,135,114

VACUUM BRAKE BOOSTER

Edward A. Rockwell, Chicago, Ill., assignor, by mesne assignments, to General Auto Parts Corporation, a corporation of Delaware Application July 3, 1934, Serial No. 733,599

35 Claims. (Cl. 188—152)

My invention relates to an apparatus by means of which the application of power may be effectively increased with the aid of power means brought into action therein. More particularly, however, the invention relates to means whereby the power applied to a member on an automotive vehicle may be readily increased, as, for example, by increasing the manual application of power in the operation of the brakes thereof.

The object of my invention is particularly to provide a power boosting mechanism having general application, which has many advantages, especially when applied to the operation of automotive vehicle brakes. The object is, furthermore, to provide a brake booster in which it is not necessary for the manual operation of the brakes to be applied through the boosting mechanism, in which the mechanism is capable of being applied to any brake installation and such that the parts may be made lighter, more dependable, as well as simpler and cheaper in construction. Furthermore, the structure made in accordance with my invention is capable of more delicate control in the operation of the brakes. This is accomplished largely by reason of securing the balancing control of the brakes within the valve itself, which is used in controlling the application of power to the brake. Further objects of my invention will appear from the detailed description of the same hereinafter.

While my invention is capable of being applied in many different ways, for the purpose of illustration I have shown only certain examples of the same in the accompanying drawings, in which—

Fig. 1 is a diagrammatic elevation of a power booster embodying my invention, as applied to the operation of automobile brakes;

Fig. 2 is a vertical section of the vacuum controlling valve therein;

Fig. 3 is a side elevation of the same;

Fig. 4 is an other side elevation thereof, taken at right-angles thereto;

Fig. 5 is a plan view of the same;

Fig. 6 is an elevation of the flat check valve used for the vacuum inlet to the controlling valve;

Fig. 7 is a diagrammatic section showing a detail of the vacuum admission valve;

Fig. 8 is a vertical section of a modified form of controlling valve;

Fig. 9 is an elevation of the same;

Fig. 10 is a vertical section of another modification of the vacuum controlling valve;

Fig. 11 is a vertical section at right angles to Fig. 10;

Figure 12:
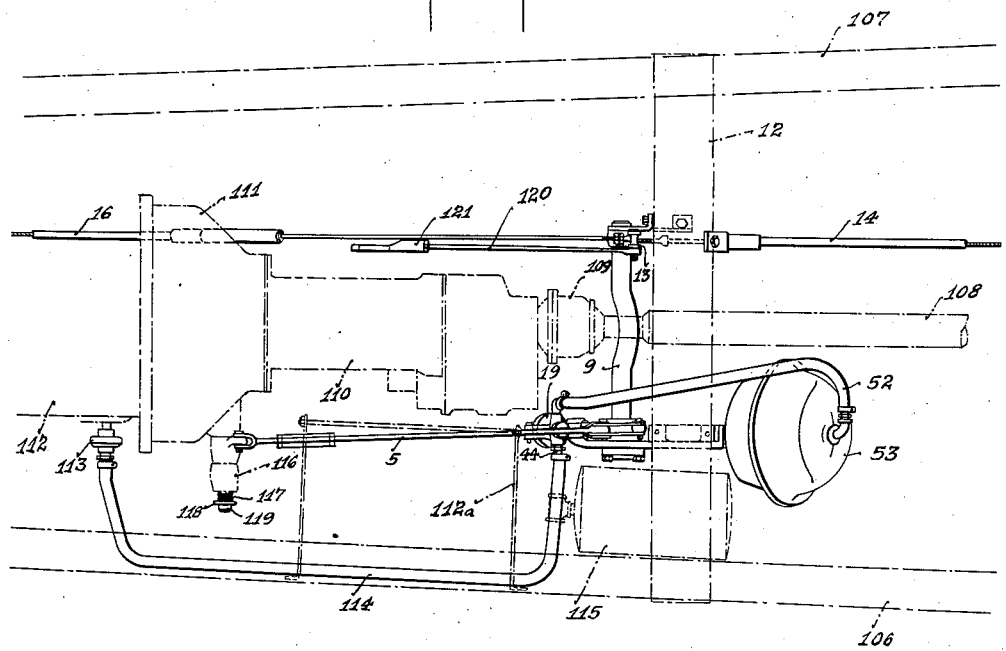
Fig. 12 is a plan view of the arrangement of my invention as applied to an automobile chassis.

In the apparatus made in accordance with my invention, as shown in Figs. 1 to 7, I have provided a brake foot pedal 1 which is mounted on a pivot 2 carried on an automobile, the same having a link 3 with a turn-buckle 4 which connects the same with a rod 5 leading to a pivot 6, which has a link 7 pivotally connecting it to an arm 8 on a brake cross-shaft 9 supported in a booster frame 10 which is carried by a saddle 11 on a cross-member 12 on the frame of the automobile. The said brake cross-shaft 9 also carries tight thereon a lever arm 13 to which is connected a cable 14 leading to the brakes on the rear wheels of the automobile. Another arm 15, tight on said shaft 9, is connected by a cable 16 to the brakes on the front wheels of the automobile. Thus, the operation of the master arm 8 manually applies the brakes to the automobile. In addition, however, the said pivot 6 is connected by a link 17 to a lever 18 on a valve casing 19. The valve casing 19 is connected by a bolt 20 to the booster frame 10. The lever 18 has an actuating screw 21 which is capable of adjustment, as desired. Said screw provides the initial movement of an operating arm 22 for operating the controlling valve but the end of the lever 18 has a curved, or tapering surface 23 which contacts with the arm 22 in such a way that the operating movement of the lever 18 advances the contact between the lever 18 and the arm 22 shifting towards the left in Fig. 2 so as to increase the degree of movement of the valve mechanism while decreasing the pressure applied to the valve mechanism for a given movement of the manual means. The arm 22, which is also pivoted to the valve casing 19, rests against the top of a valve stem 24 having a rubber boot 25 forming a seal around a projection 26 on the top of the valve casing. The valve stem 24 extends downwardly through a vacuum chamber 27 and at the lower end is provided with a reduced end 28 providing a shoulder 29 against which is clamped an upwardly bowed valve disk 30 seating against a rubber valve seat 31 carried in the lower end of the chamber 27. Below the valve disk 30 there is a soft rubber gasket 32 against which there is held in place a downwardly bowed valve disk 33. Below the disk 33 there is a further rubber gasket 34 against which there is screwed into place a nut 35 for holding the valve disks in place. A helical spring 36 rests against the lower face of the disk 33 and at its lower end is supported within a soft rubber valve seat 37 adapted to cooperate with the valve disk 33. The valve seat 37 is supported within a retaining shell 38 within a bottom cover 39 which is screwed to the valve casing 19 so that the shell 38 is clamped against the lower portion of the valve casing 19. In the lowermost portion of the cover 39 there is a copper-wool strainer 40 overlying a disk having a series of holes 41 for the inlet of air. A protecting shell 42 overlies the lower portion of the cover 39 and is provided with holes 43 for the inlet of air. Vacuum is supplied to the chamber 27 from any suitable source, such as an engine manifold or any other power source, by means of a vacuum pipe 44 which has therein a screw plug 45 having crimped around the same a shell 46 provided with a central opening 47 for the admission of the vacuum, which acts as a valve seat for a squared valve 48 having a central opening 49. This valve 48 is normally forced against its seat by a helical spring 50 around the plug 45. The vacuum, when admitted to the pipe 44, reaches the chamber 27 and after passing the valve 30 enters the main portion of the valve casing 19 and thence is conveyed by a port 51 to a pipe 52 which leads to the rear side of a diaphragm casing 53 having a diaphragm 54 clamped between the two halves thereof, which diaphragm is connected by a piston rod 55 to a link 56 pivoted to an arm 57 on the shaft 9.

In the form of my invention shown in Figs. 8 and 9, the connections are the same but the construction of the controlling valve is different to the following extent. In this instance a valve stem 58 passes through a rubber boot 59 over an extension 60 on a cover plate 61 held by screws 62 on a valve casing 63 which is provided with an air inlet port 64, a vacuum connection 65 having the same connections and equipment as described in connection with Figs. 1 to 7, and a vacuum applying connection 66 leading to a diaphragm chamber such as the chamber 53 already described. The valve stem 58 is pivotally connected to a rocker arm 67 having a long lever 68 and a short lever 69. The long lever 68 contacts with an apertured vacuum plunger 70 having a vacuum port 71 which communicates with a port 72 in the vacuum inlet 65. The said plunger, furthermore, has a spring supporting shell 73 for supporting a spring 74 and the lower end of this spring is carried within a vented cap 75 screwed in the casing 63. The short lever 69 cooperates with an apertured air inlet plunger 76 provided with a port 77 leading to a part 78 in the air inlet 64. The said plunger 76 has therein a spring supporting shell 79 for supporting a spring 80, the lower end of which is retained by a vented cover 81 screwed into the casing 63.

In the further modification of my invention, as set forth in Figs. 10 and 11, which is the preferred form, the construction is the same as previously described in the other forms of my invention except that a different vacuum control valve is utilized. In this form of my invention the lever 22 is pivoted on a valve casing 82 having an adjustable screw stop 83 to limit the downward movement on the lever 22. Said lever 22 actuates a plunger 84 having a rubber-boot 85 at the top thereof extending around a flanged projection 86 on the top of the valve casing 82. Adjacent to the rubber boot 85 there are a plurality of air inlet openings 87 which communicate with a valve chamber 88, at the top of which there is a rubber valve seat 89 cooperating with a cylindrical valve member 90 having a hub 91 which is guided on the stem 84 and is normally pressed downwardly by a helical spring 92 resting at one end on the valve member 90 and at the other end against the top of the valve chamber 88. At its lower portion the cylindrical valve member 90 cooperates with a plurality of levers 93, the outer ends of which extend beneath said cylindrical valve seat and the inner ends of which are located beneath the lower end of the stem 84. The levers 93 are pivoted near the middle thereof upon a notched shell 94 which is secured at its lower portion to an upwardly bowed valve disk 95 and to a flexible diaphragm 96 and a spring-support plate 97, by means of a rivet 98. The diaphragm 96 is held in place against the valve casing 82 by a screw-threaded cover plate 99 which acts as a support for a helical spring 100 received at its upper end by the plate 97. An adjusting screw 101 in the cover 99 acts as a stop, limiting the downward movement of the valve 95. Furthermore, said valve 95 cooperates with a rubber valve seat 102 carried in an annular recess within the valve chamber 88. Vacuum is admitted to the chamber below the valve 95 in a space 95a by means of a passageway 104 and a vacuum pipe 105, which may have the source of vacuum as well as the vacuum inlet valve described in connection with Figs. 1 to 7. The vacuum, after passing the valve 95, is conveyed to a vacuum applying port 103 by means of which the vacuum may be applied as already described in connecttion with the preceding forms of my invention.

Figure 13:
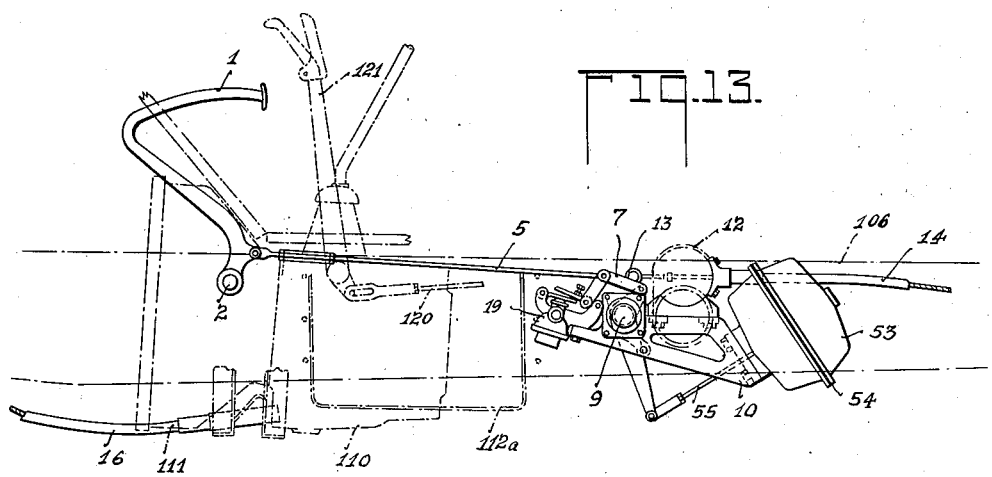
Fig. 13 is a side elevation of the same.

Figs. 12 and 13 show the general arrangement in which my invention may be applied to an automobile chassis. The parts already shown in Figs. 1 to 7 are being indicated in Figs. 12 and 13 with like numbers. In addition thereto, these Figs. 12 and 13 show, attached to the cross frame 12, the usual longitudinal frame members 106 and 107, a propeller shaft 108, a universal joint 109, a transmission housing 110, a clutch housing 111, an internal combustion engine 112 and a storage battery container 112a. A source of vacuum of any desired character, as, for example, an engine intake manifold, is connected through a union joint 113 and a pipe 114 to the vacuum pipe 44. On the pipe 114 there is furthermore provided a vacuum storage chamber 115. Also on the shaft 2 there is a clutch lever 116 which, together with the foot lever 1, is held from rattling by a spring 117 retained in place by a washer 118 and a nut 119. Attached to the outer end of the lever 13 there is also a rod 120 leading to the usual type of emergency brake lever 121.

In the operation of the form of my invention shown in Figs. 1 to 7, 11 and 12, when the brakes are to be applied the brake pedal 1 is moved downwardly pulling the links 5 and 7, which are pivoted together, forwardly, whereupon the brakes are applied manually by means of the arm 8, shaft 9 and the arms 13 and 15, to the front and rear wheel brakes. At the same time the braking effect is boosted according to the degree of downward movement of the pedal 1 through the agency of the link 17 and the levers 18 and 22. The curved surface 23 on the lever 18 will provide a shifting fulcrum between the levers 18 and 22 so that as the downward movement of the pedal 1 proceeds an increase in the movement of the stem 24 will take place with a given amount of pressure applied thereto. The first effect of the downward movement will be to close the air valve 33, followed by the opening of the vacuum valve 30, which vacuum will then be applied to the brakes through the intervention of the diaphragm 54. The vacuum thus established within the valve casing 19 between the valves 30 and 33 will then tend to pull the valve 33 open, which will, however, be offset largely by the resilient soft rubber valve seat 37, which will close the vacuum valve 30 while the brakes are still on, thus tending to balance the valve mechanism in such a manner as to apply a stable vacuum condition to any one position of the pedal 1. However, the balance is so delicate that immediately upon the release of the pressure on the pedal 1, the valve 33 will become unseated and the valve 30 seated, thereby breaking the vacuum applied to the diaphragm 54.

In the form of the invention shown in Figs. 8 and 9, a similar effect is attained by the sliding valves 70 and 76. In this instance, because of the shorter lever arm 69 the air valve 76 will be closed first when the pedal 1 is depressed and will be opened first when the foot pedal 1 is allowed to rise, the vacuum valve 70 being open following the closing of the air valve 76 when the pedal 1 is depressed and the vacuum valve 70 being closed after the air valve 76 is opened upon the release of the pressure of the pedal 1.

In the form of my invention as shown in Figs. 10 and 11, the operation is similar, although a more delicate balance is attained, thereby, the valves being readily balanced against the pressures present at any particular position of the pedal 1. In this instance, upon the downward movement of the pedal 1 the notched support 94 will first act as a pivot for the levers 93, thus moving the valve 90 upwardly to seat against the rubber ring 89, thus closing the air valve at this point, and thereafter the levers 93 will be fulcrumed at their outer ends, thus opening the vacuum valve 95. Upon the upward movement of the pedal 1 the reverse series of operations will take place, first closing the vacuum valve 95 and then opening the air valve 90. In this form it is found that no close adjustment of the valve positions is necessary in order to maintain the valves closed.

In the forms of my invention in Figs. 8 and 10, upon the depression of the pedal the air valve closes then the vacuum valve is open to admit vacuum to boost the braking effect. At any one position of the pedal lever this will be followed by the closing of the vacuum valve so that an established degree of vacuum will act upon the brakes at this particular position of the pedal. However, the further the pedal is depressed the greater will be the degree of this established vacuum and, therefore, the greater the boosting effect of the vacuum on the brakes, due to the fact that a greater degree of vacuum will be necessary to result in the closing of the vacuum valve. In the different form of the invention the movement of the vacuum and vent valves involves a slight upward thrust upon the valve stem varying according to the manual effort applied. Also, upon the upward movement of the pedal, providing lessened braking effects, the reversal will be true so that lessened established degrees of vacuum will become effective according to the manual effort applied to the pedal.

While I have described my invention above in detail I wish it to be understood that many changes may be made therein without departing from the spirit of the same.

I claim:

1. In a device of the character described, the combination of a source of pressure differing from the atmosphere, an automotive vehicle accessory means adapted to be operated thereby, an inlet valve for communicating said pressure to said means, a relief valve for relieving said pressure, means for operating said valves comprising a manually operable device, and leverage leading therefrom to the valve operating means adapted to provide an increasing degree of movement of the valve mechanism for a given movement of the manual means with an increasing force of reaction on the latter in any given position reached in the advance of the latter.

2. In a device of the character described, the combination of a source of vacuum, an automotive vehicle accessory means adapted to be operated thereby, an inlet valve for communicating said vacuum to said means, a relief valve for relieving said vacuum, means for operating said valves comprising a manually operable device, and leverage leading therefrom to the valve operating means adapted to provide an increasing degree of movement of the valve mechanism for a given movement of the manual means with an increasing force of reaction on the latter in any given position reached in the advance of the latter.

3. In a device of the character described, the combination of a source of pressure differing from the atmosphere, an automotive vehicle accessory means adapted to be operated thereby, an inlet valve for communicating said pressure to said means, a relief valve for relieving said pressure, means for operating said valves comprising a manually operable device, and leverage leading therefrom to the valve operating means adapted to provide an increasing degree of movement of the valve mechanism for a given movement of the manual means, including a pair of contacting lever arms, one of which has a curved contacting surface.

4. In a device of the character described, the combination of a source of vacuum, an automotive vehicle accessory means adapted to be operated thereby, an inlet valve for communicating said vacuum to said means, a relief valve for relieving said vacuum, means for operating said valves comprising a manually operable device, and leverage leading therefrom to the valve operating means adapted to provide an increasing degree of movement of the valve mechanism for a given movement of the manual means, including a pair of contacting lever arms, one of which has a curved contacting surface.

5. In a device of the character described, the combination of a source of pressure differing from the atmosphere, an automotive vehicle accessory means adapted to be operated thereby, an inlet valve for communicating said pressure to said means, a relief valve for relieving said pressure, means for operating said valves comprising a manually operable device, and leverage leading therefrom to the valve operating means adapted to provide an increasing degree of movement of the valve mechanism for a given movement of the manual means, including a pair of contacting lever arms, one of which has a curved contacting surface, the latter having an adjustable initial contact member.

6. In a device of the character described, the combination of a source of vacuum, an automotive vehicle accessory means adapted to be operated thereby, an inlet valve for communicating said vacuum to said means, a relief valve for relieving said vacuum, means for operating said valves comprising a manually operable device, and leverage leading therefrom to the valve operating means adapted to provide an increasing degree of movement of the valve mechanism for a given movement of the manual means, including a pair of contacting lever arms, one of which has a curved contacting surface, the latter having an adjustable initial contact member.

7. In combination, a device adapted to be moved to perform work, a manual pull-through actuator directly connected therewith, and a power operated means adapted to move said device, comprising a source of pressure differing from the atmosphere, a rigidly mounted valve chamber adapted to maintain a given pressure derived therefrom, a valve plunger associated therewith having means connecting it to the manual actuator, and an inlet valve and a relief valve associated with said plunger, adapted to control the entrance and exit of said pressure to said valve chamber by the pressure exerted on said valves, the said connecting means being moved according to the reaction pressure on the said valves.

8. In combination, a device adapted to be moved to perform work, a manual pull-through actuator directly connected therewith, and a power operated means adapted to move said device, comprising a source of vacuum, a rigidly mounted valve chamber to maintain a given vacuum derived therefrom, a valve plunger associated therewith having means connecting it to the manual actuator, and an inlet valve and a relief valve associated with said plunger adapted to control the entrance and exit of said vacuum to said valve chamber by the vacuum exerted on said valves, the said connecting means being moved according to the reaction pressure on the said valves.

9. In combination, a device adapted to be moved to perform work, a manual pull-through actuator directly connected therewith, and a power operated means adapted to move said device, comprising a source of pressure differing from the atmosphere, a valve chamber adapted to maintain a given pressure derived therefrom, a valve plunger associated therewith having means connecting it to the manual actuator, and rigid inlet and relief valves associated with said plunger, adapted to control the entrance and exit of said pressure to said valve chamber, the said connecting means being moved according to the reaction pressure on the said valves.

10. In combination, a device adapted to be moved to perform work, a manual pull-through actuator directly connected therewith, and a power operated means adapted to move said device, comprising a source of vacuum, a rigidly mounted valve chamber adapted to maintain a given vacuum derived therefrom, a valve plunger associated therewith having means connecting it to the manual actuator, an inlet valve and a relief valve associated with said plunger adapted to control the entrance and exit of said vacuum to said valve chamber, and a spring for normally closing the vacuum valve, the said connecting means being moved according to the reaction pressure on the said valves.

11. In combination, a device adapted to be moved to perform work, a manual pull-through actuator directly connected therewith, and a power operated means adapted to move said device, comprising a source of pressure differing from the atmosphere, a valve chamber adapted to maintain a given pressure derived therefrom, a valve plunger associated therewith having means connecting it to the manual actuator, rigid inlet and relief valves associated with said plunger adapted to control the entrance and exit of said pressure to said valve chamber, and a spring for normally closing the pressure valve, the said connecting means being moved according to the reaction pressure on the said valves.

12. In combination, a source of pressure differing from the atmosphere, an automotive vehicle accessory means adapted to be operated thereby, a valve chamber adapted to maintain a given pressure derived therefrom, a valve plunger associated therewith, rigid inlet and relief valves associated with said plunger adapted to control the entrance and exit of said pressure to said valve chamber, and soft resilient seats provided for said valves.

13. In combination, a source of vacuum, an automotive vehicle accessory means adapted to be operated thereby, a valve chamber adapted to maintain a given vacuum derived therefrom, a valve plunger associated therewith, rigid inlet and relief valves associated with said plunger adapted to control the entrance and exit of said vacuum to said valve chamber, and soft resilient seats provided for said valves.

14. In combination, a source of pressure differing from the atmosphere, an automotive vehicle accessory means adapted to be operated thereby, a valve chamber adapted to maintain a given pressure derived therefrom, a valve plunger associated therewith, rigid inlet and relief valves associated with said plunger adapted to control the entrance and exit of said pressure to said valve chamber, and soft resilient seats provided for said valves, said valves being dished towards their respective valve-seats.

15. In combination, a source of vacuum, an automotive vehicle accessory means adapted to be operated thereby, a valve chamber adapted to maintain a given vacuum derived therefrom, a valve plunger associated therewith, rigid inlet and relief valves associated with said plunger adapted to control the entrance and exit of said vacuum to said valve chamber, and soft resilient seats provided for said valves, said valves being dished towards their respective valve seats.

16. The combination of a source of pressure differing from the atmosphere, an automotive vehicle accessory means adapted to be moved thereby, a plunger inlet valve and a plunger relief valve for controlling the supply of pressure thereto, a manually operable rocker lever connecting said valves together, and a plunger connected to said rocker lever in such a manner as to alternately seat the valves and in which the reaction against the manual operating movement is the pressure against the effective area of one or more of said valves.

17. The combination of a source of vacuum, an automotive vehicle accessory means adapted to be moved thereby, a plunger inlet valve and a plunger relief valve for controlling the supply of vacuum thereto, a manually operable rocker lever connecting said valves together, and a plunger connected to said lever in such a manner as to alternately seat the valves and in which the reaction against the manual operating movement is the pressure against the effective area of one or more of said valves.

18. In a device of the character described, the combination of a source of pressure differing from the atmosphere, an automotive vehicle accessory means adapted to be moved thereby, a manual controlling means for the same and rigidly coupled thereto, a valve casing having a valve means therein controlled by said manual means and including a pressure responsive inlet valve, a relief valve, a valve chamber for said valves, a valve operating plunger and a lever means in the valve chamber extending from the plunger to the relief valve pivotally supported from the inlet valve.

19. In a device of the character described, the combination of a source of vacuum, an automotive vehicle accessory means adapted to be moved thereby, a manual controlling means for the same, a valve casing having a valve means therein controlled by said manual means and including a vacuum responsive inlet valve, a relief valve, a valve chamber for said valves, a valve operating plunger and a lever means in the valve chamber extending from the plunger to the relief valve pivotally supported from the inlet valve.

20. In a device of the character described, the combination of a source of pressure differing from the atmosphere, an automotive vehicle accessory means adapted to be moved thereby, a manual controlling means for the same, a valve casing having a valve means therein controlled by said manual means and including a pressure responsive inlet valve, a relief valve, a valve operating plunger and a lever means extending from the plunger to the relief valve pivotally supported from the inlet valve, the lever pivot being located intermediate its ends, one end being supported against the relief valve and the other end against the plunger in order to provide the inlet valve as a pivot for closing the relief valve initially and the relief valve as a pivot for operating the inlet valve when the relief valve is seated.

21. In a device of the character described, the combination of a source of vacuum, an automotive vehicle accessory means adapted to be moved thereby, a manual controlling means for the same, a valve casing having a valve means therein controlled by said manual means and including a vacuum responsive inlet valve, a relief valve, a valve chamber for said valves, a valve operating plunger and a lever means in the valve chamber extending from the plunger to the relief valve pivotally supported from the inlet valve, the lever pivot being located intermediate its ends, one end being supported against the relief valve and the other end against the plunger in order to provide the inlet valve as a pivot for closing the relief valve initially and the relief valve as a pivot for operating the inlet valve when the relief valve is seated.

22. In a device of the character described, the combination of a source of pressure differing from the atmosphere, an automotive vehicle accessory means adapted to be moved thereby, a manual controlling means for the same, a valve casing having a valve means therein controlled by said manual means and including a pressure responsive inlet valve, a relief valve, a valve operating plunger, a lever means extending from the plunger to the relief valve pivotally supported from the inlet valve, the lever pivot being located intermediate its ends, one end being supported against the relief valve and the other end against the plunger in order to provide the inlet valve as a pivot for closing the relief valve initially and the relief valve as a pivot for operating the inlet valve when the relief valve is seated, and a diaphragm spring support for the inlet valve.

23. In a device of the character described, the combination of a source of vacuum, an automotive vehicle accessary means adapted to be moved thereby, a manual controlling means for the same, a valve casing having a valve means therein controlled by said manual means and including a vacuum responsive inlet valve, a relief valve, a valve operating plunger, a lever means extending from the plunger to the relief valve pivotally supported from the inlet valve, the lever pivot being located intermediate its ends, one end being supported against the relief valve and the other end against the plunger in order to provide the inlet valve as a pivot for closing the relief valve initially and the relief valve as a pivot for operating the inlet valve when the relief valve is seated, and a diaphragm spring support for the inlet valve.

24. In a device of the character described, the combination of, a source of fluid pressure, an automotive vehicle accessory means adapted to be operated thereby, a valve means for controlling the application of said fluid pressure, a manual means for moving said accessory means, so arranged as to transmit a laterally directed component of and transverse to said moving force to control the application of the fluid pressure by said transverse component, to operate the accessory means.

25. In a device of the character described, the combination of, a source of fluid pressure, an automotive vehicle accessory means adapted to be operated thereby, a valve means for controlling the application of said fluid pressure, a manual means for moving said accessory means, so arranged as to transmit a laterally directed component of and transverse to said moving force to control the application of the fluid pressure by said transverse component, to operate the accessory means by modulating the fluid pressure applied by the extent of movement of the manual means.

26. In combination, a device adapted to be moved to perform work, a manual actuator directly connected therewith, a valve controlled source of power adapted to move said device and means for taking off from the manual actuator providing an operating force which is a laterally directed component of and transverse to the force provided from the manual actuator so as to operate said valve by said transverse component.

27. In combination, a device adapted to be moved to perform work, a manual actuator, a source of fluid pressure differing from the atmosphere, a cylinder connected to the said source of pressure, a piston in said cylinder connected to said device, a valve means connected to the manual actuator to control the application of pressure to said cylinder, a common pivotal means for the connection from the piston and the manual actuator to said device, a lever on said pivotal means adapted to be connected to the manual actuator, and links having pivots connecting said lever and said valve to the manual actuator in such a relation as to substantially maintain the pivots of the pivotal means and links in the position of a parallelogram during the actuation by the manual means.

28. In combination, a device adapted to be moved to perform work, a manual actuator, a source of fluid pressure differing from the atmosphere, a cylinder connected to said source of pressure, a piston in said cylinder connected to said device, and a valve means connected to the manual actuator to control the application of pressure to the cylinder, said valve means comprising a lever and link which are adapted to be maintained parallel during the valve operation.

29. In combination, a device adapted to be moved to perform work, a manual actuator, a source of fluid pressure differing from the atmosphere, a cylinder connected to said source of pressure, a piston in said cylinder connected to said device, and a valve means connected to the manual actuator to control the application of pressure to the cylinder, said valve means comprising a lever and link having the same length from their pivots, which are adapted to be maintained parallel during the valve operation.

30. In combination, a device adapted to be moved to perform work, a manual actuator, a source of fluid pressure differing from the atmosphere, a cylinder connected to said source of pressure, a piston in said cylinder connected to said device, and a valve means connected to the manual actuator to control the application of pressure to the cylinder, said valve means comprising a lever and link having the same length from their pivots, which are adapted to be maintained parallel during the valve operation and apply to the cylinder from the valve accurately modulated changes in pressure.

31. In combination, a device adapted to be moved to perform work, a manual actuator, a source of fluid pressure differing from the atmosphere, a cylinder connected to said source of pressure, a piston in said cylinder connected to said device, and a valve means connected to the manual actuator to control the application of pressure to the cylinder, said valve means comprising a lever mechanism having a changing effective lever length in the operation of the valve with an increasing force of reaction on the manual means in any given position reached in the advance of the latter.

32. In combination, a device adapted to be moved to perform work, a manual actuator, a source of fluid pressure differing from the atmosphere, a cylinder connected to said source of pressure, a piston in said cylinder connected to said device, and a valve means connected to the manual actuator to control the application of pressure to the cylinder, said valve means comprising a lever mechanism having a changing effective lever length comprising two cooperating valve-operating levers having a changing effective lever length.

33. In combination, a device adapted to be moved to perform work, a manual actuator, a source of fluid pressure differing from the atmosphere, a cylinder connected to said source of pressure, a piston in said cylinder connected to said device, and a valve means connected to the manual actuator to control the application of pressure to the cylinder, said means comprising a valve actuating lever containing a valve operating detent.

34. In combination, a device adapted to be moved to perform work, a manual follow-through actuator directly connected therewith, and a power operated means adapted to move said device, comprising a source of pressure differing from the atmosphere, a rigidly mounted valve chamber adapted to maintain a given pressure derived therefrom, a valve plunger associated therewith having means connecting it to the manual actuator, and an inlet valve and a relief valve associated with said plunger, adapted to control the entrance and exit of said pressure to said valve chamber by the pressure exerted on said valves, the said connecting means being moved according to the reaction pressure on the said valves.

35. In combination, a device adapted to be moved to perform work, a manual follow-through actuator directly connected therewith, and a power operated means adapted to move said device, comprising a source of vacuum, a rigidly mounted valve chamber to maintain a given vacuum derived therefrom, a valve plunger associated therewith having means connecting it to the manual actuator, and an inlet valve and a relief valve associated with said plunger adapted to control the entrance and exit of said vacuum to said valve chamber by the vacuum exerted on said valves, the said connecting means being moved according to the reaction pressure on the said valves.

EDWARD A. ROCKWELL.